Jan. 4, 1966  B. H. LEVELTON  3,227,530
PROCESS OF PRODUCING FUEL LOGS
Filed Oct. 16, 1961
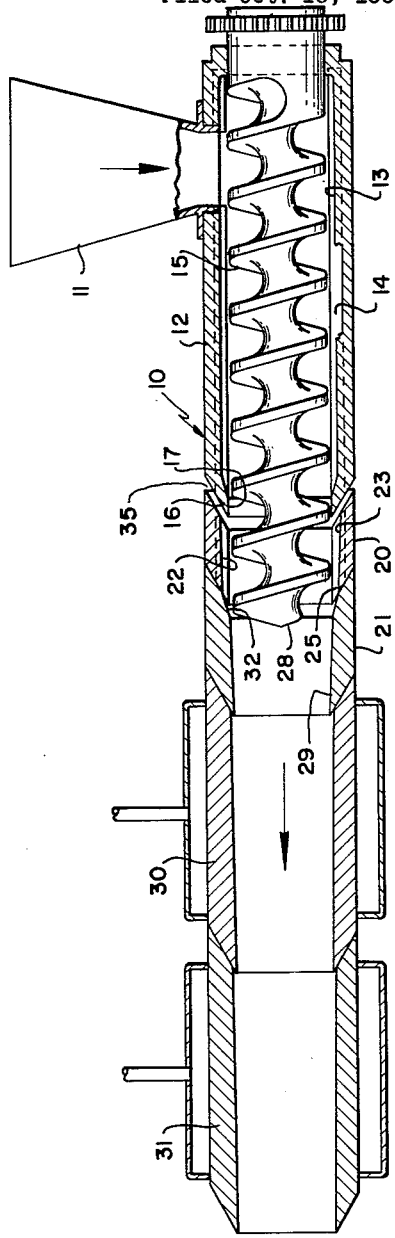
INVENTOR
BRUCE H. LEVELTON
BY
Fetherstonhaugh & Co.
ATTORNEYS 3,227,530
PROCESS OF PRODUCING FUEL LOGS
Bruce H. Levelton, Vancouver, British Columbia, Canada, assignor to British Columbia Research Council, Vancouver, British Columbia, Canada
Filed Oct. 16, 1961, Ser. No. 145,423
7 Claims. (Cl. 44—1)

This invention relates to a process for producing fuel logs from ligno-cellulosic material in the form of particles, and particularly from wood sawdust, chips and the like. The product resulting from this process is called a log because it is preferably cylindrical in shape, but it is understood that it may be of any desired shape or size.

Fuel logs made from sawdust and other ligno-cellulosic materials in particulate or fiber form have been manufactured for a number of years. The existing processes require dry feed material for successful operation and the products have poor moisture stability. These logs tend to disintegrate when wetted, and may deteriorate seriously in very damp atmospheres. The need for drying the feed material prior to processing results in high production costs. Alternatively, these processes may use dry material such as is available from remanufacturing operations, but this seriously limits the sources and amounts of suitable material.

A further disadvantage of using dry feed material is the high pressure required for forming and extruding a log. The high pressure requires equipment sufficiently strong to withstand the forces generated and also needs means for supplying the high pressure. Capital costs for such heavy equipment are much higher than those for the lighter construction suitable for the process described herein. Lubrication is another problem, and the dry material is a constant fire hazard.

The main object of the present invention is the provision of a process for producing fuel logs from wet feed material, which markedly reduces production costs and permits the use of simple, inexpensive equipment.

Another object is the provision of a process for producing fuel logs that are water stable. The process may be operated to produce logs that can be immersed in water indefinitely without disintegrating.

The improved fuel logs may be made from any ligno-cellulosic material, but the principal materials used are sawmill residues, such as sawdust, chips and the like. However, bagasse, seed hulls and the like may be used. The basis of the process is the utilization of natural bonding agents present in the ligno-cellulosic material to produce a stable strong log. Best results have been obtained with the wood species, Western Red cedar (*Thuja plicata*), and the redwoods (*Sequoia sempervirens* and *Sequoia gigantea*) since these contain a large amount of natural bonding agent. Although other wood species contain lesser amounts of natural bonding agents, satisfactory logs can be made from them. Any suitable binding agent may be added to materials which possess little natural bonding agent, and other materials, such as coal fines, may be added to any feed material to enhance its burning qualities and to dispose of waste products.

The size of particles used for feed is not critical although it obviously is not practical to consider material which cannot be handled by conventional conveying equipment. Small chips, splinters and sawdust are typical acceptable feeds, while feed size is preferably anywhere from hog fuel down to fine sawdust.

In contrast to existing processes for producing fuel logs, the ligno-cellulosic material in the present process preferably has a moisture content of at least 30 to 35 percent (wet basis). This initial moisture content results in a moisture content of at least 15 percent (wet basis) at the time the feed is being compacted into a dense mass. Prior processes start with feed below 12 percent moisture content. In the present process there is no upper limit on moisture content. The water is an essential component of the process and acts as a lubricant, a tempering medium, and a chemical ingredient in obtaining the bonding reaction.

The process according to the present invention consists of compressing wet ligno-cellulosic particles into a compact mass; generating throughout the compacted mass a temperature sufficient to create in the presence of moisture a chemical change which is evidenced by a dense water-stable product. It is preferable to extrude the mass through cooling tubes which "set" the log in its final form. Excess moisture is squeezed out of the mass during the first compression. During the first compression the mass is heated, and the process is so designed that pressure on the heated mass is suddenly released, allowing the hot water in the feed particles to flash and disintegrate them. These disintegrated particles are particularly suitable for forming a stable log because the bonding agent is very readily released from them. The compacted bonded mass is thermoplastic when hot and contains superheated water. Consequently, it is desirable to provide some means for cooling the surface of the formed log while maintaining circumferential restraint so that a thick skin of cooled stable material will hold the log together when it is released from the high forming pressure.

The accompanying drawing shows one form of apparatus for producing fuel logs in accordance with the present process.

Referring to the drawing, 10 is apparatus for forming fuel logs. This apparatus includes a hopper 11 for directing material in particle form, such as wood sawdust, chips or the like into an extrusion sleeve 12. This sleeve has a cylindrical bore 13 provided with longitudinal keys 14 projecting inwardly therefrom. An extrusion screw 15, driven in any suitable manner, is rotatably mounted in the bore and moves the particle material through the sleeve. The discharge end 16 of the sleeve is decreased in size to form a throat 17 without keys therein and just fitting around the screw. The feed screw projects from sleeve 12, extends through a stator 20 and extends part way through a tubular extrusion die 21. Stator 20 has a convergent bore 22 extending therethrough, said bore being larger at 23 than the screw at the entrance end of the stator. Keys 25 extend longitudinally of stator bore 22, extend inwardly into the latter and just clear screw 15.

The end of the extrusion screw 15 is formed with a pressure face 28 located just beyond the end of the stator 20 and within die 21. This extrusion die has a parallel bore 29 and abuts against the stator 20. Cooling tubes 30 and 31 with progressively increasing bore diameters are attached to the die 21. A small taper 32 is required at the entrance end of the die 21 to enable the keys 25 of stator 20 to project above the stator surface for its full length without producing a shoulder where the die and stator join.

Ports 35 are cut through the extrusion section at the junction of extrusion sleeve 12 and convergent-bore stator 20. The ports may comprise one complete annular ring, or a number of individual holes, each located on the leeward or ineffective side of one of the keys 25.

As the feed material is transported along the extrusion sleeve 12, the keys 14 prevent the material from rotating with the screw. The stator action of these keys, therefore, is very important because ligno-cellulosic materials are extremely difficult to transport in screw-type conveyors. The feed passes through the throat 17 and passes the ports 35. Very little material is lost through the ports because of their shape, and also because they are usually located on the ineffective (leeward) side of the keys 25. The feed material then enters the convergent-bore stator 20 where keys 25 provide stator action for the full length of the tube. At the end pressure face 28 of screw 15, the material is subjected to increasing pressure as it is forced against the compacted mass in die 21. This compression process forces water from the feed material. The water runs backward along the stator 20 and is removed through the ports 35. Since the effective sides of keys 25 are full of semi-compressed material, the water can escape only along the leeward sides of the keys. The friction between the face of the screw and the material being deposited on the compacted mass in extrusion die 21 raises the temperature of the mass very rapidly. Since the pressure face 28 is radial and is formed by the run-out of the last flight of the screw, every particle of material is subjected to increasing pressure and temperature, followed by a sudden release of pressure at said face. The moisture remaining in the feed material flashes because it is superheated at the lower pressure, disintegrating many of the particles. The steam so formed escapes along the stator 20 and through the ports 35, carrying with it a small amount of fine solid material. As the compression face of the screw again comes around the flashed particles are forced on to the compacted material in the die and covered by new material transported into the zone. Since the screw 15 is turning rapidly, the laydown, heating and flashing of material is essentially a continuous process resulting in a continuous extrusion of compacted material through the extrusion die 21, and a continuous rejection of water, water-soluble material, and fine solid material through the ports 35.

The compacted mass in die 21 must be sufficiently hot to promote the release of natural bonding agents in the feed material. Moisture and heat are both vital factors in accomplishing this release, and it is for this reason that the process requires a minimum moisture content of about 15 percent (wet basis) at the time the material is being compacted. Excess moisture in the feed is not a problem because it is removed during the primary compression stage and escapes through ports 35.

The hot compacted and bonded material passes from extrusion die 21 to the first of a series of cooling tubes 30 and 31. These cooling tubes cool the mass sufficiently to prevent it from expanding when circumferential restraint is removed. The hot mass contains superheated water, and since it is plastic when hot, the mass would tend to expand and crack severely if removed directly from the extrusion die to the atmosphere. The tubes 30 and 31 are normally cooled with water, although other cooling agents can be used. The cooling process makes use of the discovery that it is much easier to heat or cool a poorly conducting mass when it is moist than when it is dry. This principle allows the use of short cooling tubes in the process.

A principal function of the cooling tubes, apart from "setting" the log, is to provide back pressure in the extrusion system. A compacted mass can be built up only when adequate back pressure exists immediately in front of the screw face 28. This back pressure is provided chiefly by the extrusion die 21 and the first cooling tube 30. Succeeding cooling tubes offer some back pressure, but their chief function is to "set" the log. The cooling tubes are generally of slightly larger diameter than the extrusion die, and usually the diameters of the dies are successively increased as indicated in FIGURE 1. This construction is desirable to prevent too high a back pressure in the system.

It is desirable to discharge the log sufficiently cool for it to be stable, but still containing adequate heat to evaporate a portion of the contained moisture. This arrangement speeds the drying of the product.

The formation of a satisfactory log depends on the temperature of the mass immediately ahead of the compression face 28 of the extrusion screw 15. If the temperature is to high, thermal decomposition may commence with consequent danger of explosion. Also, it has been found that the bonding agents present in such ligno-cellulosic materials as Western Red cedar become so active at elevated temperatures that extremely high pressures are required to extrude the mass. In these cases it is considered that the bonding agent acts as an adhesive between the compacted material and the extrusion die. A log produced at temperatures above the optimum range is characterized by a dark brown homogeneous structure in which individual particles and fibers cannot be distinguished. If the temperature is too low, the natural bonding agents are not activated, and the log produced is weak and unstable. However, with some types of particulate material, it may be advisable or necessary to add thereto a suitable bonding agent.

The optimum temperature range is dependent on the feed material. With Western Red cedar and the redwoods, satisfactory logs have been produced with extrusion die wall temperatures ranging from 240 F. to 300 F. It must be recognized that these temperatures are measured in the metal of the die, and are not the same as temperatures at the compression face of the screw. They bear a direct relation to the log temperature, however, and are essential for process control. Since the temperature in the compacted mass is dependent on the frictional force between the face of the extrusion screw and the mass of material, and since the frictional force depends on the direct longitudinal force between the mass and the screw face, the temperature is controlled principally by the amount of back pressure or restraint offered by the extrusion die and the cooling tubes. The size and configuration of these elements, therefore, are very important in operating the process successfully.

If desired, the feed material can be heated before it is introduced into the process, or external heat may be applied to the material while it is passing through the process. Normally, sufficient heat is generated by friction at the compression face of the screw to satisfy all requirements.

The method of de-watering wet feed effects a marked improvement over existing processes. The accepted lower limit for mechanical de-watering of such materials as sawdust and hog fuel is about 50 percent moisture content (wet basis). The process described herein normally yields a product containing from 20 to 25 percent of moisture, although moisture contents as low as 15 percent have been obtained. This extension of the mechanical de-watering range is an important feature of the process because mechanical removal of water is much cheaper than thermal removal of water.

While the process removes excess moisture from the feed material, about 25 to 30 percent (wet basis) of moisture usually remains. It has been found that this level of moisture is desirable for smooth operation of the process. However, fair results are obtained with the moisture content down to about 15 percent. The water has three main functions in the process. First, it is an essential ingredient in the activation of the natural bonding agents. This activation does not occur in dry wood. Second, it acts as a tempering medium in maintaining uniform temperatures throughout the log as it is formed. Third, it acts as a lubricant in the extrusion process. Measurements have demonstrated that it is much easier to extrude moist hot logs than dry hot logs.

The joint actions of temperature, moisture and pressure have been established by test. If any one factor is not present or the quantity is inappropriate, the quality of the finished product is seriously affected. In this process chemical and physical reactions are utilized to activate the natural bonding agents in the feed material for producing a stable strong fuel log.

This process produces a continuous cylindrical product that may be cut or broken into logs of any desired length. This is a distinct advantage over the batch processes and apparatus of the prior art. The water squeezed out of the material contains extractives and some fine pulp which may be used for other purposes or fed back to the incoming material.

What I claim as my invention is:

1. The process of producing fuel logs from ligno-cellulosic material in particulate form which comprises compressing ligno-cellulosic particles with a moisture content of at least 15 percent wet basic into a compacted mass while allowing freed moisture to escape and under pressures and temperatures sufficient to induce, in the presence of moisture, flashing of a portion of the moisture into steam on subsequent momentary reduction of the pressure, with consequent disintegration of the particles, but not sufficient to start thermal decomposition of the mass; simultaneously removing steam as it is generated; and instantly compressing said disintegrated material without thermal decomposition into a dense substantially solid, water-stable product.

2. The process of producing fuel logs from ligno-cellulosic material in particulate form which comprises compressing ligno-cellulosic particles with a moisture content of at least 15 percent wet basis into a compacted mass while allowing freed moisture to escape and under pressures and temperatures sufficient to induce, in the presence of moisture, flashing of a portion of the moisture into steam on subsequent reduction of the pressure, with consequent disintegration of the particles, but not sufficient to start thermal decomposition of the mass; simultaneously removing steam as it is generated; instantly re-applying pressures and temperatures sufficient to create, in the presence of residual moisture, a chemical change evidenced by a dense substantially solid, water-stable product and without thermal decomposition; and cooling the surface of the product, while it is under restraint, to form a strong circumferential skin to hold the product intact when it is subsequently released from restraint.

3. The process of producing fuel logs from ligno-cellulosic material in particulate form which comprises compressing wet ligno-cellulosic particles under pressures high enough to squeeze a portion of the moisture from the compacted mass while allowing the squeezed-out moisture to escape and further compressing the particles, with a residual moisture content of at least 15 percent wet basis, into a compacted mass under pressures and temperatures sufficient of create, in the presence of moisture, a chemical change evidenced by a dense, water-stable product, but not sufficient to start thermal decomposition of the mass.

4. The process of producing fuel logs from ligno-cellulosic material in particulate form which comprises compressing wet wood particles under pressures high enough to squeeze a portion of the moisture from the compacted mass; removing the expressed moisture; further compressing the particles, with a residual moisture content of a least 15 percent wet basis, into a compacted mass under pressures and temperatures sufficient to liberate some chemical constituents of the wood which thereafter function to bond the said particles together, and to create, in the presence of moisture, a chemical change evidenced by a dense, water-stable product, but not sufficient to start thermal decomposition of the mass; and cooling the surface of the product, while it is under restraint, to form a strong circumferential skin to hold the product intact when it is subsequently released from restraint.

5. The process of producing fuel logs from ligno-cellulosic material in particulate form which comprises compressing wet cellulosic particles under pressures high enough to squeeze a portion of the moisture from the compacted mass to reduce the moisture content thereof to not less than about 15 percent wet basis while allowing the squeezed-out moisture to escape; further compressing the compacted mass under pressures and temperatures sufficient to induce, in the presence of residual moisture, flashing of a portion of the moisture into steam on subsequent momentary reduction of the pressure, with consequent disintegration of the particles, but not sufficient to start thermal decomposition of the mass; simultaneously removing the steam as it is generated; and instantly compressing said disintegrated material without thermal decomposition into a dense, substantially solid, water-stable product.

6. The process of producing fuel logs from ligno-cellulosic material in particulate form which comprises compressing wet cellulosic particles under pressures high enough to squeeze a portion of the moisture from the compacted mass to reduce the moisture content thereof to not less than about 15 percent wet basis while allowing the squeezed-out moisture to escape; further compressing the compacted mass under pressures and temperatures sufficient to induce, in the presence of residual moisture, flashing of a portion of the moisture into steam on subsequent momentary reduction of the pressure, with consequent disintegration of the particles, but not sufficient to start thermal decomposition; simultaneously removing steam as it is generated; and instantly reapplying pressure to press the disintegrated particles into substantially a solid and sufficient to create a chemical change without thermal decomposition evidenced by a dense water-stable product; and cooling the surface of the product, while it is under restraint, to form a strong circumferential skin to hold the product intact when it is subsequently released from restraint.

7. The process of producing fuel logs from ligno-cellulosic material in particulate form which comprises compressing wet cellulosic particles under pressure high enough to squeeze a portion of the moisture from the compacted mass to reduce the moisture content thereof to not less than about 15 percent wet basis while allowing the squeezed-out moisture to escape; further compressing the compacted mass under pressures and temperatures sufficient to induce, in the presence of residual moisture, flashing of a portion of the moisture into steam on subsequent momentary reduction of the pressure, with consequent disintegration of the particles, but not sufficient to start thermal decomposition; simultaneously removing the steam as it is generated; and instantly reapplying pressure to press the disintegrated particles into substantially a solid and sufficient to create a chemical change without thermal decomposition evidenced by a dense water-stable product; and cooling the surface of the product, while it is under restraint, sufficiently only to form a strong circumferential skin while leaving sufficient heat to evaporate a portion of the contained moisture when the product is subsequently released from restraint.

References Cited by the Examiner

UNITED STATES PATENTS

| Re. 23,948 | 2/1955 | Fuller | 159—2 |
| 1,156,096 | 10/1915 | Price | 159—2 |
| 2,224,212 | 12/1940 | Bowling | 18—125 |
| 2,648,262 | 8/1953 | Crocton et al. | 162—290 |
| 3,070,485 | 12/1962 | Strickman | 44—13 X |

FOREIGN PATENTS

| 457,753 | 6/1949 | Canada. |
| 559,500 | 7/1958 | Canada. |
| 627,048 | 3/1936 | Germany. |

DANIEL E. WYMAN, *Primary Examiner.*

JOSEPH R. LIBERMAN, *Examiner.*